United States Patent
Amar

(10) Patent No.: US 11,640,470 B1
(45) Date of Patent: May 2, 2023

(54) SYSTEM AND METHODS FOR REDUCING AN ORGANIZATION'S CYBERSECURITY RISK BY DETERMINING THE FUNCTION AND SENIORITY OF EMPLOYEES

(71) Applicant: Proofpoint, Inc., Sunnyvale, CA (US)

(72) Inventor: Shmuel Amar, Shoham (IL)

(73) Assignee: Proofpoint, Inc., Sunnyvale, CA (US)

( * ) Notice: Subject to any disclaimer, the term of this patent is extended or adjusted under 35 U.S.C. 154(b) by 476 days.

(21) Appl. No.: 16/935,993

(22) Filed: Jul. 22, 2020

Related U.S. Application Data

(60) Provisional application No. 62/948,487, filed on Dec. 16, 2019, provisional application No. 62/945,465, filed on Dec. 9, 2019.

(51) Int. Cl.

| | |
|---|---|
| *G06F 21/57* | (2013.01) |
| *H04L 9/40* | (2022.01) |
| *G06N 20/00* | (2019.01) |
| *G06N 5/04* | (2006.01) |
| *G06Q 10/10* | (2012.01) |
| *G06Q 10/06* | (2012.01) |
| *G06Q 50/18* | (2012.01) |
| *G06Q 10/105* | (2023.01) |
| *G06Q 10/0637* | (2023.01) |
| *G06Q 10/0635* | (2023.01) |
| *G06Q 50/26* | (2012.01) |

(52) U.S. Cl.
CPC .............. *G06F 21/577* (2013.01); *G06N 5/04* (2013.01); *G06N 20/00* (2019.01); *G06Q 10/0635* (2013.01); *G06Q 10/06375* (2013.01); *G06Q 10/105* (2013.01); *G06Q 50/184* (2013.01); *H04L 63/0263* (2013.01); *H04L 63/10* (2013.01); *G06F 2221/034* (2013.01); *G06Q 50/265* (2013.01)

(58) Field of Classification Search
CPC . G06F 21/577; G06F 2221/034; G06N 20/00; G06N 5/04; G06Q 10/0635; G06Q 10/06375; G06Q 10/105; G06Q 50/184; G06Q 50/265; H04L 63/0263; H04L 63/10
See application file for complete search history.

(56) References Cited

U.S. PATENT DOCUMENTS

2017/0078322 A1* 3/2017 Seiver ................... G06F 21/577
2021/0174305 A1* 6/2021 Schornack ............ H04L 63/102

* cited by examiner

*Primary Examiner* — Matthew T Henning
(74) *Attorney, Agent, or Firm* — FisherBroyles LLP; Alan D. Minsk

(57) ABSTRACT

Systems, methods, and apparatuses directed to implementations of an approach and techniques for more effectively preparing for, detecting, and responding to cybersecurity threats directed at people or at groups of people. Embodiments are directed to classifying or segmenting employees by "predicting" what are believed to be two attributes of an employee that contribute to making them at a higher risk of being a target of a cybersecurity attack. These attributes are the employee's seniority level (e.g., employee, contractor, manager, executive, board member) and the employee's primary function or role in an organization (e.g., HR, Legal, Operations, Finance, Marketing, Sales, R&D, etc.

20 Claims, 7 Drawing Sheets

See Step 306 of Figure 3

SYSTEM AND METHODS FOR REDUCING AN ORGANIZATION'S CYBERSECURITY RISK BY DETERMINING THE FUNCTION AND SENIORITY OF EMPLOYEES

CROSS REFERENCE TO RELATED APPLICATIONS

This application claims the benefit of U.S. Provisional Application No. 62/948,487, entitled "System and Methods for Determining the Function and Seniority of Employees," filed Dec. 16, 2019, the disclosure of which is incorporated, in its entirety (including the Appendix), by this reference.

This application incorporates by reference the entire contents of U.S. Provisional Patent Application No. 62/945,465 entitled "Systems and Methods for Modeling and Segmentation of People Oriented Risk in Cybersecurity Applications," filed Dec. 9, 2019.

BACKGROUND

Cybersecurity (also sometimes referred to as computer security or information technology (IT) security) relates to the protection of computer systems, computing devices, and networks from the theft of, or damage to, hardware, software, or electronic data, as well as from the disruption or misdirection of the services they provide. The data may include proprietary information, payment information, or personal information, and may be of interest to foreign state actors, competitors, or those seeking to commit fraud via identify theft.

While personal computing devices and servers located behind firewalls were formerly the primary "targets" of malicious actors, with the development and acceptance of "cloud-based" services, the set of targets has now expanded to include networks and remotely located servers used as part of a Software-as-a-Service platform. These remote servers are connected by one or more networks (e.g., wired, wireless, dedicated, etc.) to users who access data stored remotely or add data to remotely located data storage components. Users may also instruct processors in the servers to perform specified operations on the data. Over time, the combination of a greater number of users, greater amounts of potentially valuable data and information, and an increase in the potential entry points for a malicious actor have contributed to an increased cybersecurity threat. This increased threat or degree of cybersecurity risk has been responded to with the conventional tools available to security/IT analysts, where these tools are those associated with detecting and responding to threats that could result in unauthorized access to, or disruption of, IT assets, such as computers, servers, or networks. However, these conventional tools are of limited value in addressing cybersecurity risks in the changing threat environment and when addressing threats to the increased types and numbers of potential targets.

Conventional approaches and tools used to respond to and address the changes in the cybersecurity threat landscape suffer from one or more disadvantages. These include an inability to alter security protocols based on the behavior or situation of individual users, a need to expend a large amount of IT or security personnel time and resources on device-specific installations and updates, and in general, being based on a highly non-granular approach to providing security. These limitations of conventional approaches and tools become even more problematic in view of the expansion of cybersecurity attacks to include specific people or groups, as well as networks and remote servers or other infrastructure.

Systems and methods are needed for more efficiently and effectively responding to the recent changes in the cybersecurity threat landscape. Embodiments of the inventions described herein are directed toward solving these and other problems individually and collectively.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification of this patent, to any or all figures or drawings, and to each claim.

In recent years, the cybersecurity threat landscape has shifted from malicious actors targeting IT infrastructure (such as networks, servers, and computing devices) to actors targeting people who are users of devices, networks, and applications. One reason for this is that malicious actors have realized that some people are more likely to serve as an entry point for an attack on a system or network, or to provide access to other targets of interest. By focusing on specific people instead of a large number of devices, a malicious actor can sometimes improve their chances of obtaining access to the information they are interested in obtaining.

One goal of the approach of targeting users or groups of users is to leverage weaknesses in their behavior and hopefully trick them into exposing their credentials, thereby gaining access to data, email accounts, systems, cloud applications, servers, and networks of potential value to a malicious actor. Malicious actors also hope to leverage a user's identity and credentials to obtain access to other people, accounts, and IT assets within an organization.

While some malicious actors may still initiate broad-scale attacks on a large number of people because such attacks have a low, but still acceptable probability of being successful, in recent years actors have chosen to apply a more selective targeting approach. This more selective approach may include performing prior research on potentially valuable targets, including people having access to proprietary data and systems and/or those whose behavior suggests they are more likely to provide access to valuable data, and then initiating a highly customized attack on a target.

These types of customized attacks may be viewed as based on characteristics of a person that make them more likely to be a target of an attack and/or that make an attack more likely to be successful. As a result, cybersecurity teams are now facing a new "people" focused attack vector and would benefit from tools and approaches that can help them to cope with this growing problem. Among other benefits, embodiments of the system and methods described herein provide such tools and approaches and can assist an IT or cybersecurity professional to more effectively identify people or groups at higher risk from such customized, people-oriented attacks.

As will be described, in some embodiments, this may be accomplished by a segmentation process that evaluates multiple characteristics of a person that may make them a potential target or that may make an attack on that person more likely to be successful. Based on the segmentation, embodiments then recommend or allow a security analyst to apply an appropriate risk reduction or security protocol to each person or group of similarly situated people to reduce the likelihood of an attack and/or the likelihood of a successful attack.

As mentioned, conventional approaches and tools for addressing device-based cybersecurity threats have significant limitations and disadvantages when used to confront threats targeted at people or groups of people. These limitations of conventional approaches include:

- the difficulty in obtaining a comprehensive picture of cybersecurity, which combines multiple types of threats such as email related threats, cloud-based accounts and data, networks, etc.;
- conventional methods protect assets (i.e., physical or virtual devices and networks) rather than people, and are not applicable to monitoring and protecting such a large number of potential targets or objects (this is at least partly because the number of users is much higher than the number of assets);
- conventional methods do not consider non-threat related user characteristics that might influence security, such as user seniority, business function, personal behavior, department, etc.; and
- conventional methods do not include an effective mechanism for tracking progress and comparing the security status of an organization to that of other organizations as a way of benchmarking or evaluating the security efforts of the organization.

Embodiments of the disclosure are directed to systems, apparatuses, and methods for more effectively preparing for and responding to cybersecurity threats directed at people or at groups of people. In some embodiments, this is achieved by adopting a perspective on the security function that is people-centric instead of the conventional device-centric approach. This change in perspective leads to developing techniques to identify users most likely to be a target and/or thought to be most susceptible to a malicious attack and providing a security/IT team with tools to understand and manage possible threats to these users.

More specifically, in some embodiments this goal is accomplished, at least in part, by a process that automatically identifies people having a characteristic that may increase their likelihood of being a target of a cybersecurity attack. In some examples, this characteristic is that of a person's seniority level and/or their role in an organization. A person's seniority and role can make them a more likely target because more senior employees in certain functional areas (such as Legal, Finance, Sales, R&D) often have access to proprietary or confidential information that might be of value to others. They also often have access to other systems, networks, and devices that might be of interest to a source of an attack.

Other objects and advantages of embodiments of the disclosure will be apparent to one of ordinary skill in the art upon review of the detailed description and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1A:
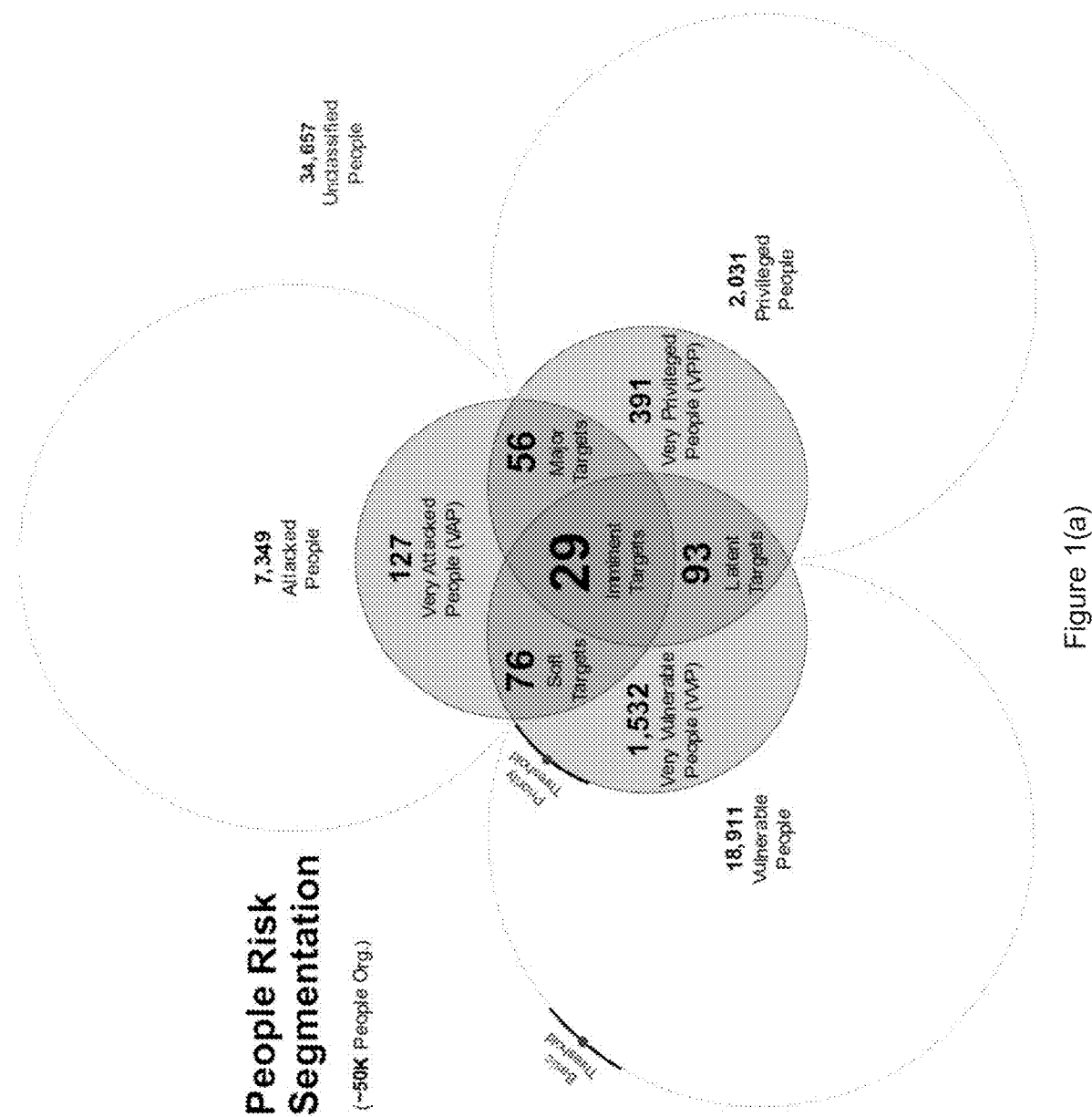
FIG. 1(a) is a diagram illustrating an example of how the members of an organization may be segmented into groups more or less likely to be the target of a cybersecurity attack and hence to present a risk based on (a) general attributes of being privileged, vulnerable, or attacked, (b) belonging to a sub-group considered to be a higher risk member of the group having the general attribute and (c) belonging to an intersection of one or more of the sub-groups.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the invention will be described more fully herein with reference to the accompanying drawings, which form a part hereof, and which show, by way of illustration, exemplary embodiments by which the invention may be practiced. The invention may, however, be embodied in different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), or other form of computing or data processing system, device, or platform.

The processing element or elements may be programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or any other suitable form. The following detailed description is, therefore, not to be taken in a limiting sense.

Embodiments of the systems, methods, and apparatuses described herein are directed to implementations of an approach and techniques for more effectively preparing for, detecting, and responding to cybersecurity threats directed at people or at groups of people. In some embodiments, this is achieved by adopting a perspective on the security function that is people-centric instead of the conventional device-centric approach. This change in perspective motivates the development of techniques to identify users most likely to be a target of and/or susceptible to a malicious attack and providing a security/IT team with tools to understand and manage possible threats directed at these users.

As noted, malicious actors have begun applying a more selective approach to identifying potential targets for a cybersecurity attack. This more selective approach may include researching potentially valuable targets, including people having access to proprietary data and systems and/or those whose behavior suggests they are more likely to provide access to valuable data, and then initiating a highly customized attack on a target. These customized attacks may be based on, or attempt to take advantage of, characteristics of a person that make them more likely to be a target of an attack and/or that make an attack more likely to be successful (for example, as a result of a person's response to a simulated cybersecurity attack).

Identifying which people or group of people in an organization are at a higher risk for being the subject of a cybersecurity attack, or more likely to be the subject of a successful attack, and focusing resources on protecting those users is of high value (and a correspondingly high return on investment) to cybersecurity teams. In addition to identifying and protecting those users, embodiments can also provide ways to prevent those people or groups from being the subject of an attack, or at least reduce the possibility of an attack. This can be done by applying constraints on how those users access proprietary data, how they connect to the network, websites they may visit using the company network, etc.

As an example, highly attacked people, highly privileged people (e.g., people expected to have access to important information, networks, and systems containing important information, or to others in an organization, such as CEOs, CFOs, and GCs) and highly vulnerable people (those with a history or indication of being more susceptible to an attack, or who engage in conduct that represents vulnerable behavior) introduce higher risk of being the subject of an attack or of a successful attack. As a result, they should be subject to increased scrutiny and the application of appropriate security procedures by a security team, where the security procedure applied to each of the groups may specifically address why they are a potential target of an attack.

Further, in larger organizations, focusing solely on individuals and their devices, or applying security measures across an entire organization are not effective or efficient operational practices. Instead, segmenting people into groups with different types and levels of cybersecurity related risks (while also identifying reasons that make members of the group a worthwhile target and/or susceptible to an attack), and in response providing appropriate risk management and training resources to each segment is a more effective approach and also a more efficient allocation of resources for addressing cybersecurity risk.

Thus, while conventional cyber/information security risk management approaches and tools focus on measurement of risk associated with IT assets, the concept of "people centric risk" as described herein and in U.S. Provisional Patent Application No. 62/945,465 provides a measure of the cybersecurity risk a person or similarly situated group of people introduce to an organization. In some embodiments, this is accomplished by considering risk models that are customized to reflect how people as a vector fit in the traditional cybersecurity landscape.

Embodiments of the system and methods described in U.S. Provisional Patent Application No. 62/945,465 provide a cybersecurity team with techniques to segment people into different groups corresponding to different levels and types of risk—this process is termed "People Risk Segmentation (PRS)" herein. In one embodiment, these groups may include people that belong to one or more of a group of Attacked People (AP), Vulnerable People (VP), and Privileged People (PP). A risk score, metric, or level may be associated with each member of each group. The risk score, metric, or level may be a result of combining other scores, metrics, or levels obtained from an evaluation of factors that impact a person's likelihood of being attacked or of an attack being successful.

The factors evaluated, and the higher-level groups or categories are believed to be of significance for purposes of analysis and mitigating people-centric risk. The scores and assignment to a higher-level group can be used to sort a set of people, where the factors may suggest a person's likelihood of being a target of an attack (e.g., their previous history of being attacked and/or their access to potentially valuable information) and/or the likelihood of an attack being successful (e.g., based on their behavior or cybersecurity training experience).

In some embodiments, the definition of these groups may be as follows:

AP (attacked people)—people previously subjected to a cybersecurity attack, i.e., the target(s) of an attack;

VP (vulnerable people)—people whose behavior increases a chance of account take over or other harm (such as identify theft) in a case of an attack (e.g., people who click on the links within phishing emails or who have not completed some aspect of cybersecurity training); and PP (privileged people)—people who have access to confidential information/systems within an organization and hence may provide entry points to data and systems of interest to malicious actors (e.g., finance, legal departments, sales, R&D, etc.). Such people generally include executives, project managers, people having access to valuable financial or technical data, etc.

Note that members of each of these groups may have specific characteristics or behaviors that make them a relatively more or less significant target for an attack.

Identifying and focusing on people with a relatively higher risk in each group provides subset groups of Very Attacked People (VAP), Very Vulnerable People (WP), and Very Privileged People (VPP). These sub-groups may be identified by determining which group members have a profile, history, or behavior that causes them to exceed a predetermined (and in some examples, adjustable) threshold or level for one or more of a group's characteristics.

In some embodiments, the intersections of these sub-groups or subset(s) identify targets or sets of people at risk, with some at greater risk, or at greater risk from a specific type of attack. In some embodiments, these intersections are defined as: Imminent Targets (IT=VAP+WP+VPP), Major Targets (MT=VAP+VPP), Latent Targets (LT=VPP+WP) and Soft Targets (ST=WP+VAP). Although risk prevention or reduction procedures can be applied to people in different groups (AP, VP, PP) or sub-groups (VAP, VVP, VPP), these sub-group intersections of people at relatively higher levels of risk or at greater risk from a specific type of attack can be the subject of (or basis for) specific risk control actions, training, interventions, monitoring, more immediate action, etc.

Segmenting the people in an organization into the groups, sub-groups and intersections of sub-groups (and hence into target types or profiles) described herein may provide a cybersecurity team with one or more of the following benefits:

The ability to associate people in an organization with their relative degree of risk, and in response to prioritize the application of cybersecurity prevention and remediation services;

The ability to correlate different security threats and modes of attack to obtain a fuller picture of the cybersecurity threat to an organization; and The ability to take person or group-specific actions to reduce the likelihood of a successful cybersecurity attack and take proactive steps to prevent further attacks.

An example of this segmenting of employees or members of an organization that can be used to reduce the organization's cybersecurity risk is illustrated in FIG. 1(a). As mentioned, segmenting people into groups with different types and levels of cybersecurity related risks, and in response providing appropriate risk management and training resources to each segment or group is a more effective approach and a more efficient allocation of resources for addressing cybersecurity risk than one focused on individuals or taking an organization-wide approach.

FIG. 1(a) is a diagram illustrating an example of how the members of an organization may be segmented into groups more or less likely to be the target of a cybersecurity attack and hence to present a risk based on (a) a general attribute of being privileged, vulnerable, or attacked, (b) belonging to a sub-group considered to be a higher risk member of the group having the general attribute and (c) belonging to an intersection of one or more of the sub-groups. As shown in the figure, a group of people may be segmented into one of the three primary groups based on meeting a basic threshold value for membership in that group. The threshold value may depend upon previous behavior or levels of behavior, previous history of being the target of an attempted attack or being in a position where they have access to information or systems that may be of interest to a malicious party. Further, a subset of each group may present a relatively higher risk by having a behavior, history or position that indicates a characteristic exceeding a priority threshold for a particular group (e.g., this defines the members of the VAP, WP, and VPP sub-groups).

As is apparent from the discussion of the factors that might cause an employee to be a "target" of a cybersecurity attack, a person's position and/or function in an organization can be an indicator of whether that person is likely to have access to confidential or proprietary information, or is able to access systems and networks that contain such information. Such employees may also have the ability to access systems, devices, and networks within an organization that may provide access to other user's accounts and those accounts may contain proprietary or confidential data. As a result, such a person may be considered a "privileged person" (PP) in the cybersecurity model that has been described. This means that it would be beneficial when developing and implementing a security program to be able to accurately identify such privileged persons to more effectively determine the risk for those persons, for their functional group or department, and also for an organization as a whole.

Being able to identify an employee or member of an organization as a privileged person (i.e., segmenting or assigning them to that specific risk group) may be used as part of modeling the organization's risk and also as a risk indicator for the employee. Assigning a person to the group of privileged people (PP) can be part of developing a cybersecurity model for the entire organization, but also (or instead) can be used to identify persons belonging to the privileged person group independently of the assessment of organizational risk. The identification of a person as belonging to the privileged persons group permits an appropriate set of risk reduction or control measures to be applied to that person by virtue of belonging to that group. Additional risk procedures or protocols may be applied if the person is found to be a member of the very privileged person (VPP) group or part of a target group formed from an intersection of other groups or sub-groups. As a result, there is value to being able to identify a person as belonging to the privileged persons group or segment for its own sake and as part of the larger segmentation, modeling, and reduction of an organization's sources of cybersecurity risk.

As will be described herein with reference to the use of a risk modeling tree, a person's role and/or function in an organization can be a factor in the cybersecurity risk they present to an organization and also a factor in determining their total risk. Determining a persons' role and/or function may translate into a risk measure or score that is combined with metrics or scores representing other risk contributions to generate a person's score with regards to a group or category of risk (such as the AP, VP, and PP groups described), and hence is a factor in determining their total cybersecurity risk. A risk modeling tree or similar structure can be used to indicate how the various contributions are combined to generate the risk scores for a group or category, and hence how a persons' role and/or function contributes to their individual risk and to the risk they present to an organization. Thus, in some embodiments, the system and processes described herein may be used as part of generating a risk metric or score for a portion of a risk modeling tree, for example.

Upon first consideration, one might expect that a standard organizational chart would be satisfactory to identify employees who might be targets of a cybersecurity threat based on their position, title, and presumed access to valuable data or systems that store such data. However, while helpful, the information contained in this type of chart is not conclusive. This is at least in part because organizational charts and job titles may not be specific enough to indicate an employee's level of access to specific data, networks, or systems. Similarly, an organizational chart may not accurately indicate the reporting relationship between employees having a common title or who are not related in a hierarchical fashion. For example, the assistant to a CEO is closely connected to the CEO on an organizational chart but will typically have less access to corporate systems and data sources than a Director of Engineering who may not report directly to the CEO. Further, organization charts are not consistent across organizations and can vary in ways that make titles and reporting relationships less applicable to other industries. For example, in some industries there are multiple people having the title of vice-president; however, the meaning of this title in terms of responsibilities and impact on an organization can vary greatly.

Embodiments of the system and methods described herein are directed to classifying or segmenting employees by determining what are believed to be two attributes of an employee that contribute to placing them at a higher risk of being a target of a cybersecurity attack. These attributes are the employee's seniority level (e.g., employee, contractor, manager, executive, board member) and the employee's primary function or role in an organization (e.g., HR, Legal, Operations, Finance, Marketing, Sales, R&D, etc.). One or both of these two attributes can be used as part of a larger process to determine the overall risk of an employee being a target (in some sense, the likelihood of an attack), and a combination of certain of the two attributes may indicate a greater potential risk (e.g., a person having an executive seniority level in a finance function would typically be considered to be at a relatively high risk of an attack).

As used herein, the term or phrase "employee's job characteristics" or "employee job characteristic data" refers to information about one or more aspects of an employee's job. Examples include but are not limited to the employee's title and the department in which they are working.

As used herein, the term or phrase "employee's seniority level" refers to the employee's category or level in terms of the overall organizational hierarchy. Examples include but are not limited to contractor, salaried employee, manager, executive (C-level), or board member.

As used herein, the term or phrase "employee's function or role" refers to the employee's primary area or department of responsibility within an organization. Examples include but are not limited to HR, Legal, Financial, Product, R&D, Sales, Operations, Marketing, etc.

As used herein, the term or phrase "cybersecurity risk" or "risk"" refers to a measure of the likelihood of a person, employee, group, sub-group, target type, or organization being the target of a cybersecurity attack or of the likelihood of an attack being successful. It may also refer to a measure of the potential damage to the organization if the user's account is compromised. In some examples, the attack may be intended to obtain unauthorized access to data or information, to devices, to networks, or to systems. In one example, an attack may be in the form of an attempt to obtain a person's credentials, such as username and password. The cybersecurity risk or risk may be expressed in any suitable manner, including, but not limited to a score, a range of scores, a descriptive level or degree, an indication of inclusion in a specific risk category or group, etc.

As used herein, the term "dynamic" as used with reference to the membership of a person, group, sub-group, or target type refers to the characteristic that the members of a group, sub-group, or target type, or the category a person is placed into, are not fixed and may change over time. Such changes can be due to a change in a person's function within an organization, a task they are assigned or have completed, a change to a threshold for "membership" in a group or sub-group, a time period over which certain events are counted, a change in a person's behavior, etc.

In some embodiments, determining the seniority and/or business function attributes of an employee may be based on analyzing the title and department of each employee in an organization using a trained machine learning (ML) model. The output of the model may represent a classification of the employee in terms of the employee's seniority and/or function. In some examples, the output classification may be accompanied by a confidence level or measure of the expected accuracy of the output. The classification may be used to segment the employee into a group, sub-group, or intersection of sub-groups and hence be part of estimating the risk exposure of the employee. In a more complicated model, other data may be included (such as an employee's manager's title and the distance-to-CEO in the organization hierarchy) as inputs to a trained model.

In some embodiments, a first trained machine learning model may be used to generate a prediction or classification of an employee with regards to their seniority, with a second trained model being used to generate a prediction or classification of an employee with regards to their role or primary functional area. In other embodiments, a single trained model may be used to generate a combination of both an employee's seniority and role (such as executive+legal). Further, in the example of using two trained models, a risk reduction policy or process may be applied to an employee based on the output of one or both trained models. For example, the output of the two models may indicate a relatively high level of confidence in an employee's role but not in their seniority level. In this situation, it may be desirable to apply a risk policy based only on the employee's role (and vice versa).

Note that there are likely multiple contributions to the total cybersecurity risk of an organization or an individual. With regards to an individual, the risk may be due to one or more attributes of the person. Such attributes may include but are not limited to factors that are relevant to the likelihood of the person being attacked (such as a previous history of attacks or level of access to data and systems) or the likelihood of an attack being successful (such as a person's behavior in response to an attack). In some examples, more than one trained model may be used, with each model generating a score, metric, or level that is normalized and combined to produce an overall risk score or evaluation, and/or to allow the person to be assigned or segmented into a risk group, sub-group, target group, etc. Thus, in some examples, the model(s) used to determine an employee's seniority and/or role may be part of a set of trained models used to evaluate a person's overall cybersecurity risk or potential risk, with the outputs being combined to generate a score or metric representing the person's risk and also their contribution to the overall organization risk.

In some embodiments a trained machine learning model may be used to generate a score, metric, level, etc. for one or more "leaves" or nodes of a risk modeling tree or similar structure representing the contributions to a risk category. A risk modeling tree defines/illustrates a hierarchy of risk attributes or risk factors that are believed relevant to assessing the cybersecurity risk posed by a person or group of people. In one example, a risk modeling tree includes a series of nodes or "leaves" arranged into categories, where the nodes represent risk factors or behaviors that are believed to contribute to specific categories or segments of cybersecurity risk. A risk modeling tree is one example of a structure or organizing format (e.g., an Ontology) for the various forms or types of cybersecurity risk, although other forms, structures, data formats, etc. may also (or instead) be used in embodiments. The model outputs for the leaves or nodes may be combined to produce a more comprehensive risk evaluation for a person, group, sub-group, target group, etc.

In one example, at least some of the data used for training a machine learning (ML) model may be gathered from identity management systems of an organization or organizations (such as from Microsoft's Active Directory (AD) or a similar service that manages permissions and access to networked resources). Such identity management systems are typically used for enterprise or cross-network identity management, and assist in the management of individual identities, their authentication, providing authorization to access devices, systems, networks, and data, and for managing roles and privileges.

In one example, for each employee in a set of employees, the employee's job title and/or department attributes are used as part of the training data for a model. Note that other attributes (such as "distance" to CEO or other executive, number of years in current position, etc.) can be used in addition to, or instead, and may help increase the overall performance of the ML model. Such other attributes may be taken into account in variations of the described model or in a separate model. The training data may be anonymized data representing a portion of the employees of the organization or may be obtained from another source (such as previously analyzed groups or organizations in a similar industry, of a similar size, at a similar stage of growth or development, etc.).

Each employee's attribute data being used for purposes of training is tagged or labeled manually (in a process referred to as annotating) to identify each employee's correct business function (such as HR, Legal, Product, Finance, R&D, Operations, etc.) and/or seniority level (such as contractor, salaried employee, manager, executive, etc.). These labels are the desired outputs of the trained model. The labels serve to "teach" the model how to associate the input attributes (job title, department) with the desired output information (function and/or seniority).

A machine learning model is then trained on the labeled dataset. This is a form of supervised learning. The model itself may be a deep neural network (DNN) or similar form of representing a trainable set of relationships. After training, the model operates to receive as an input a "new" employee's attribute or attributes (which may be tokenized into words, but this is not required), and in response generate an output representing the employee's expected or predicted seniority and/or business function. Note that once trained, the model can automatically generate the probability of each likely seniority and/or business function classification or combination of seniority and function corresponding to a new set of inputs (i.e., a new employee's attributes).

Note that one can't always determine the seniority or business function of an employee from a person's title or department, or in some cases even by using other attributes. For example, an employee's title may be "manager" with no indication of their department or area of responsibility. In this situation, one can only guess as to the person's business function (e.g., HR, Legal, Operations, etc.). Similarly, a model may output multiple possible "predictions" of a person's seniority, role, or functional department in an organization. To address this possible uncertainty or ambiguity, embodiments may generate an additional indication of the degree of reliability a user should expect to have in a model's output, in addition to generating the outputs of the model and any corresponding probabilities of those outputs being correct (where these probabilities or scores are sometimes referred to as a confidence level).

Traditionally, with classification problems the confidence level or probability measure associated with an output is the output score of the classifier. However, in some situations this may not be sufficient for developing an accurate risk profile, so embodiments may generate a degree of reliability metric based on what is termed the "top-k-entropy". This is a measure of the entropy or distribution of the highest k scored items output by the model (for example, k=3).

To understand the value of such an entropy-based reliability measure, assume that a trained model suggests the following possible classifications for an employee's function or role, each with the indicated probability or confidence level:
33%—HR
30%—IT
30%—Legal
7% for the rest of the possible classes
In another case (i.e., for another employee), the model suggests:
33%—HR
10%—IT
10%—Legal
47% for the rest of the possible classes
In the second example, one would typically be more confident that the result is correct or can be relied upon because of the relative probabilities the model generates, even though both examples predict a 33% probability that the employee is in the HR department. Thus, in some examples, if taken alone, the output probabilities may present a misleading picture as to the reliability of the model's outputs. This is because when a model generates roughly similar output probabilities for more than one prediction or classification, it is an indication of ambiguity or uncertainty in the actual correct output and can result in errors. In this situation, a user may want to set the threshold value for acceptance of the results as being reliable higher if the usage of the model outputs is more sensitive to error (thus preferring precision). In other situations, the user may want to set a lower threshold for acceptance of the results as reliable if usage of the model outputs is more sensitive to no classification being made available (thus preferring recall).

To overcome this possible source of a discrepancy between the model outputs and probability values, and their reliability, in some embodiments the entropy or distribution of the probability values (i.e., the confidence levels) is taken into account. In one example, this is done by calculating the entropy value for the top-k results (where in one example, k=3) and using that value to determine an entropy-based reliability measure. In general, the higher the top-k entropy value of the model outputs, the lower is a user's ability to rely on the highest ranked output or outputs of the model as being correct (i.e., those having the highest probability or confidence level). Based on the example form of the top-k entropy-based reliability measure described below (1−entropy/max_entropy), if the entropy-based reliability measure falls below a predetermined threshold level, then the model output should not be considered sufficiently reliable, and the output may be classified as undetermined, uncertain, or unknown.

Entropy is intuitively interpreted as a measure of the degree of uncertainty of a system. For k=3 possibilities (e.g., the top 3 values), the highest entropy/uncertainty value (about 1.099) is if all three possibilities have a 33% probability of being correct. The lowest entropy value is 0 if one possibility has a probability of 100% and the other two have a probability value of 0%.

As an example of how this approach may be used as part of selecting the outputs of a trained model, consider the following approach:

Denote H(X) as the entropy of a random variable X, where for a set of $X_i$ outcomes, each with a corresponding probability $P_i$, the entropy is determined from:

$$H(X) = \Sigma P_i \log P_i, \text{ and}$$

MAX_ENTROPY=$H(U_k)$ where $U_k$ is a uniformly distributed random variable with k possible values.

Given this definition, in one embodiment, the top-k entropy and the corresponding entropy-based reliability measure may be used as follows:

1. Operate a trained classifier (an ML model) and output one or more possible "predictions" or classifications for an employee's role or business function, along with an associated probability or confidence level for each;
2. Operate a trained classifier (an ML model) and output one or more possible "predictions" or classifications for the employee's seniority, along with an associated probability or confidence level for each;
3. Take the top 3 probabilities from 1; denote as X3, a vector of length 3 containing the probabilities obtained from the model for the top-3 results (from the examples above—i.e., for HR, IT, Legal);
4. In one embodiment, an entropy-based reliability score or measure may be determined from: 1−(H(X3)/MAX_ENTROPY), which generates a value between zero and one. The higher the reliability score value is, the higher the degree of reliability a user may have in the highest probability output of the model being correct (i.e., the highest probability classification result, in this example HR); and
5. If the reliability score is lower than a specified threshold, then the output or outputs of the model may be indicated as undetermined, unknown, or uncertain and not relied upon as part of the segmentation process (and hence also not relied upon without more information in determining that the employee may have access to confidential or proprietary data or systems).

As described, in one embodiment, a machine learning model may be trained and used to classify an employee with regards to their seniority and/or business function. The model or models output(s) may be the basis for applying a specific security protocol or procedure to that employee because of their membership in a group of similarly categorized employees. Although this is one embodiment in which the system and methods described may be used, some embodiments are directed to using the outputs of the trained model to determine how an employee's seniority and/or role factor into the cybersecurity risk they present to an organization and to the organization's risk as a whole.

In a general sense the segmentation and cybersecurity risk remediation systems and processes described in U.S. Provisional Patent Application No. 62/945,465 may perform one or more of the following methods, functions, processes, operations, or tasks:

(a) for each of a set of people:
(1) obtain data related to cybersecurity attacks, attempted attacks and other events or activities relevant to cybersecurity for that person from security products and threat monitoring services;
this may include signals and data related to security events or security-related events (i.e., including signals and data from security products and also from events or activities that may impact security, such as on-line presence, use of specific vendors or applications, etc.);
(2) obtain data regarding the person's title, role and responsibilities from a directory of employees and information about access privileges to sensitive systems and data from a privilege management system; and
(3) obtain data regarding the person's cybersecurity training experiences and responses to real or simulated threat scenarios and information about user behavior, e.g., browsing behavior, computer usage, etc.;

(b) depending on the form of the unprocessed data or signals, convert, transform, or otherwise process the data and/or signals to generate a normalized, common or canonical format representing each of the contributions to the overall cybersecurity risk for the person:
this may include processing the signals and/or data to identify one or more aspects or characteristics of a cybersecurity attack or attempted attack, of a vendor or product, of another risk factor or contribution to risk, etc.;
in some embodiments, the cybersecurity risk factors or contributions to cybersecurity risk may be those represented in a risk modeling tree, Ontology, or other data structure—such a tree or structure represents the contributions to risk and their relationships to determining categories of risk (such as Attacked People, Vulnerable People, and Privileged People) and total risk;
the processing may include application of experience to convert a signal or data into a risk score or measure (in absolute or relative terms);
the processing may include use of one or more trained machine learning models to transform raw data or signals into a risk score or measure for a specific contribution to risk;

(c) where applicable, input relevant data into one or more trained machine learning models (such as the model(s) described herein) to output one or more risk scores, measures, metrics, or levels corresponding to the input data associated with the person;

(d) combine the normalized scores or metrics for each risk contribution as indicated by the structure and organization of a risk modeling tree or other data structure to obtain a risk score or metric for the person for each of the primary risk categories (AP, VP, PP);
combine the primary risk category scores to obtain a total or overall risk score for the person, where the combination may be performed based on a selected process, weighting, etc.;

(e) define and apply the applicable threshold or filtering values for membership in the sub-groups of Very Attacked People, Very Vulnerable People, and Very Privileged People, and based on those, if applicable, assign the person to the appropriate sub-group or sub-groups (i.e., VAP, VVP, VPP);

(f) based on assignment or segmentation into one or more of the sub-groups (VAP, VVP, VPP), determine if the person is a member of any of the target groups found from intersections of the sub-groups;

as described herein, in some embodiments, these intersections are defined as: Imminent Targets (IT=VAP+VVP+VPP), Major Targets (MT=VAP+VPP), Latent Targets (LT=VPP+VVP) and Soft Targets (ST=VVP+VAP);

(g) allow a security analyst to select and apply an appropriate security processor protocol to the members of each group, sub-group, or target group;

(h) in addition to scoring and segmentation or assignment of each of the set of people in an organization (which may include all members or employees, those in a specific division, those working on a specific contract or project, etc.), determine one or more of:

the number of people in each group, sub-group, and target group;

the identity of each person in each group, sub-group, and target group;

the total risk scores or measures of all of the people in each group, sub-group, and target group; and combine the total risk category scores for all of the people in each of the primary groups (AP, VP, PP) to obtain a total or overall risk score for the organization, where the combination may be performed based on a selected process, weighting, etc.;

note that this combining may also be performed for the sub-groups or target groups to obtain a more granular "picture" of the risk aspects or contributions to risk of an organization for purposes of comparison after the application of risk reduction procedures, for comparison with other organizations, etc.;

(i) generate a display or user interface and enable a security analyst to investigate and evaluate the risk scores and contributions to risk for the organizational as a whole from a person, a subset of people, a risk group, sub-group, or target group within the organization;

this may include providing selectable UI elements to enable an analyst to vary thresholds for sub-group membership, explore characteristics of a group (such as role, title, or other characteristic), sub-group, or target group, view contributions to the total risk score for a group, sub-group, or target group;

(j) allow the security analyst to apply an appropriate security process or protocol to the organization as whole; and (k) if desired, allow the security analyst to compare the organization to others in the same industry, location, revenue range, profit range, etc. with regards to overall risk scores, percentage of employees in a specific group, sub-group, or target group, etc.

The trained model(s) may be used in whole or in part to segment or classify a person into a specific group based on their characteristics, with each group, sub-group, or target type then being subject to potentially different security rules, policies, protocols, training, etc. In some embodiments, the machine learning model may be trained using historical data collected from multiple users and organizations, either with or without the addition of anonymized information from the organization whose employees or users are being evaluated.

As mentioned, in one example, the output(s) of the trained model(s) described herein may be used (in whole or in part) to assist in segmenting a group of people into cybersecurity risk categories according to their previous history of being a target, access to systems and information, or personal behavior (among other possible attributes). Note that the segmentation process is dynamic, as is membership in the groups, sub-groups, or target types. A person may move between the groups, sub-groups, or target types in response to changes in their role, seniority, security training, behavior or other factors.

As a result of the segmentation, embodiments enable a cybersecurity analyst to perform a set of functions, including but not limited to:

Set or modify a security policy/protocol applicable to a specific group, sub-group, or target group;

Set or modify a cybersecurity training program applicable to a specific group, sub-group, or target group;

Compare one organization's security risk profile to that of another organization;

Compare the security risk profile of the same organization over time;

Implement a risk prevention program for a specific group, sub-group, or target group;

Implement a specific remediation policy in response to a successful attack on a group, sub-group, or target group;

Monitor and evaluate the cybersecurity risk to an organization over time, including monitoring of at-risk people or groups, attack methods (the threat vector), sources of attacks and successful attacks;

Compare one organization's security/attack-prevention expenditures and approaches to that of another organization;

Allocate or reallocate cybersecurity resources and infrastructure to at-risk groups, sub-groups, or target types in response to a dynamic change in membership of a group, sub-group, or target group; and Analysis of the reasons or factors responsible for a person being moved from one group, sub-group, or target group to another; for example, a change in the magnitude of the attacks, a change in a person's privileges, or the introduction of new behavior vulnerabilities.

Note that one or more of the above remedies or policies can be applied to employees in known sensitive roles or levels after being identified by the system and methods described. For example, an analyst might apply tighter security policies and training to senior IT managers (who are more susceptible to an attack and generally have a higher impact on the level of security within an organization). As another example, a security analyst could choose to apply "softer" security measures (e.g., less restrictive policies, less complex training, etc.) to employees who have less impact on the overall security of the organization. Further, the output of the trained model described herein may be used as part an evaluation of organizational workflow or efficiency as a function of experience and/or role in the organization.

As described, in some embodiments, a machine learning model may be trained to automatically segment or classify an employee with regards to the employee's seniority level and/or functional role in an organization. As will be described further with reference to FIGS. 1(b) and 2, this is accomplished by generating a set of training data for the model that includes multiple examples of relevant data.

The data used for training a model includes information that may be indicative of, or able to be used to determine the employee's seniority and/or role (in one example, an employee's job title and department). The data for each of a set of employees are associated with a label or other indicator of the employee's correct seniority and/or role. The training data and labels are input to the model for purposes of "teaching" the model how to correctly respond to new inputs. When trained, the model will operate to respond to an input sample of data for an employee not used as part of the training data by providing an output that indicates the probabilities of an employee belonging to each of one or more seniority level classes and/or business function classes.

Figure 1B:
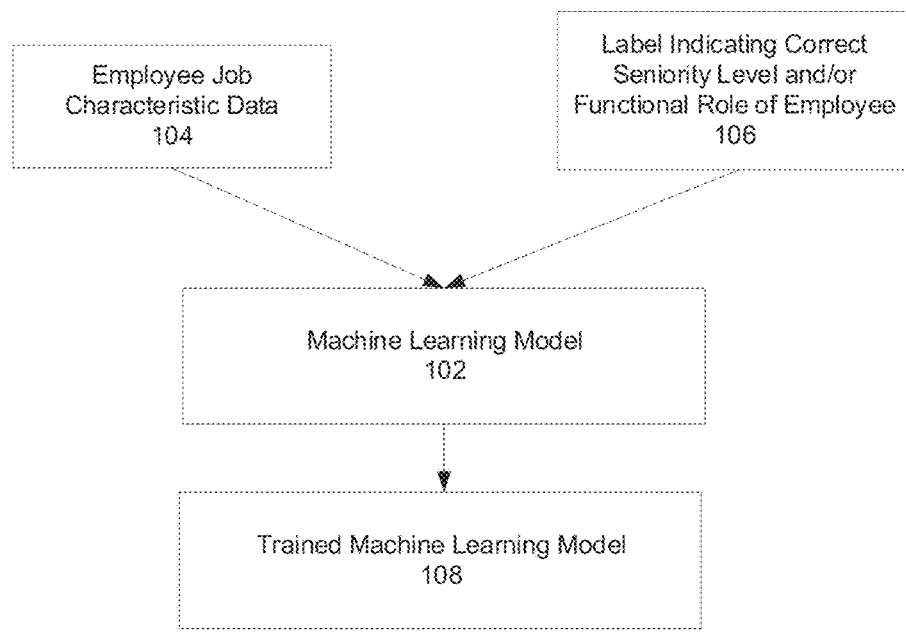
FIG. 1(b) is a diagram illustrating how a machine learning (ML) model may be trained to assist in determining a seniority level and/or functional department (business function or role) of an employee, in accordance with an embodiment of the systems and methods described herein.

FIG. 1(b) is a diagram illustrating how a machine learning (ML) model may be trained to assist in determining a seniority level and/or functional department (business function or role) of an employee, in accordance with an embodiment of the systems and methods described herein. As shown in the figure, in one example, a machine learning model 102 may be trained using a set of training data. The training data may include employee job characteristic data 104 such as job title, department, or level in an organization's hierarchy for each of a set of employees. In addition, the training data includes a corresponding label, indicator, or annotation 106 for each employee's input data specifying the correct seniority level and/or functional role for the employee. The sets of employee data and associated labels are input to the model to teach the model how to respond to the input data, producing a trained machine learning model 108. When trained, the model will operate to respond to input data for a new employee by providing an output that indicates the most likely seniority level(s) and/or function(s) of the employee.

In one embodiment, two machine learning models may be trained and used to process employee data. In this example, one model is trained to act as a classifier for an employee's seniority and a second model is trained to act as a classifier for an employee's role or function. Note that it is also possible to train a single model to do both classification tasks and to output predictions (and confidence levels or probabilities) for each of the two employee attributes or in some examples, combinations of attributes.

Figure 2:
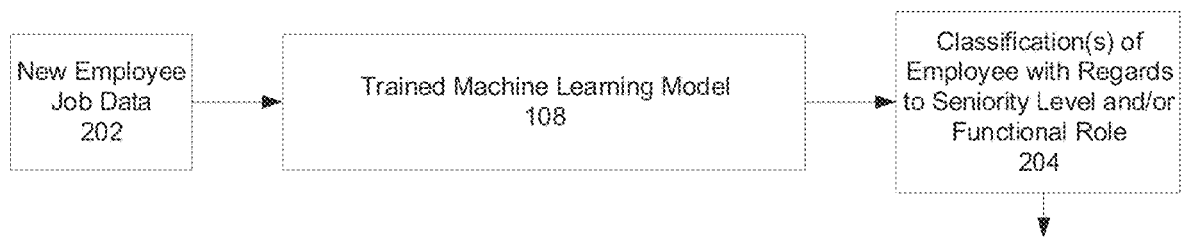
FIG. 2 is a diagram illustrating how the trained ML model of FIG. 1(b) may be used to classify an employee with regards to their seniority level and/or functional department (role), in accordance with an embodiment of the systems and methods described herein.

FIG. 2 is a diagram illustrating how the trained ML model of FIG. 1(b) may be used to classify an employee with regards to their seniority level and/or functional department (role), in accordance with an embodiment of the systems and methods described herein. As shown, a set of job-related data for a new employee 202 (one not used as part of the training data) is input to the trained machine learning model 108. In response, the model provides an output 204 which represents a classification of the input sample data (and hence the employee) with regards to their seniority level and/or functional role.

Figure 3:
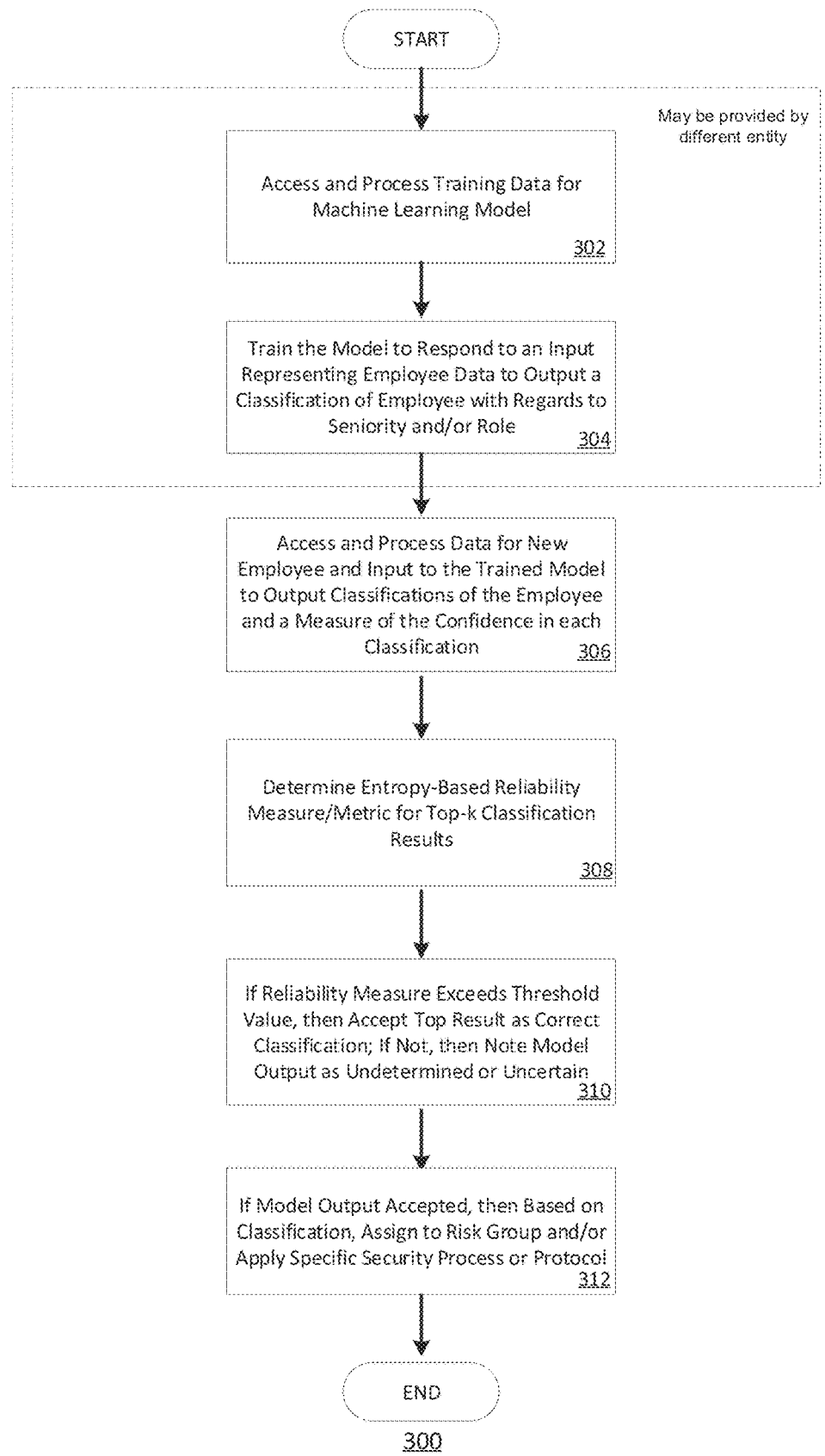
FIG. 3 is a flowchart or flow diagram illustrating a method, process, operation or function for classifying an employee with regards to their seniority level and/or functional department (role) and using that classification to reduce the cybersecurity risk exposure of an organization, in accordance with an embodiment of the systems and methods described herein.

FIG. 3 is a flowchart or flow diagram illustrating a method, process, operation or function 300 for determining or classifying an employee with regards to their seniority level and/or functional department (role) and using that classification to reduce the cybersecurity risk exposure of an organization, in accordance with an embodiment of the systems and methods described herein. As shown in the figure, the process 300 uses a trained machine learning model 304. This model may be provided by an outside entity or constructed and trained by an entity practicing the classification process described herein.

At step or stage 302, a set of training data is accessed and processed as needed. In one embodiment, the training data includes data regarding each of a set of employees. The employees may belong to a specific organization, in which case the data may be anonymized. The data regarding each employee may include one or more of title, department, or level in the organization's hierarchy. The training data also includes a label, annotation, or classification for each employee. The label denotes the correct classification or desired model output for the employee's seniority level (if the model is being trained to determine that aspect) and/or function or role in an organization (if the model is being trained for that purpose). The model is trained (step or stage 304) to respond to an input of data regarding a new employee's job characteristics and in response to generate an output representing a classification of the employee with regards to their seniority level and/or role (such as their business-related department or function).

Next, employee data for a new employee (that is, one not used for purposes of training the model) is obtained and processed (if necessary) before being input to the trained model. The output of the trained model is a classification of that employee with regards to their seniority and/or functional role (step or stage 306). The output of the model may be more than one such classification, each with its own likelihood or probability (confidence) level.

As mentioned, in one embodiment a single trained model may be used to generate an output that provides a classification of an employee with regards to both seniority and business function. In another embodiment, two separate models may be trained, with one model being used to classify an employee with regards to seniority and a second model being used to classify an employee with regards to business function.

At step or stage 308, an entropy-based measure of the reliability associated with the top-k number of outputs (and their associated probabilities or confidence levels) from the model is determined. In one example, if this measure exceeds a predetermined or specified threshold value, then the top ranked output is accepted as being reliable. If the reliability measure does not satisfy the condition on the threshold value, then the model output can be marked as undetermined or uncertain (step or stage 310). Next, if the model output has been accepted as reliable, then based on the top ranked classification, the employee may be assigned to a risk group and/or be the subject of a specific cybersecurity process or protocol (step or stage 312). Note that the value of k chosen should be large enough to capture the variance in the predictions (at least 2) and being small enough to ignore long-tail classes. Although a value of k=3 is used in the example given, with more classes (i.e., types of outputs) a larger value may result in better performance.

Note that after determining the most likely classification of an employee, a further trained model or other evaluation process may be used to assign a risk metric or score to the person by virtue of their being a potential or actual member of the group of privileged persons (PP) for purposes of assessing cybersecurity risk.

Figure 4:
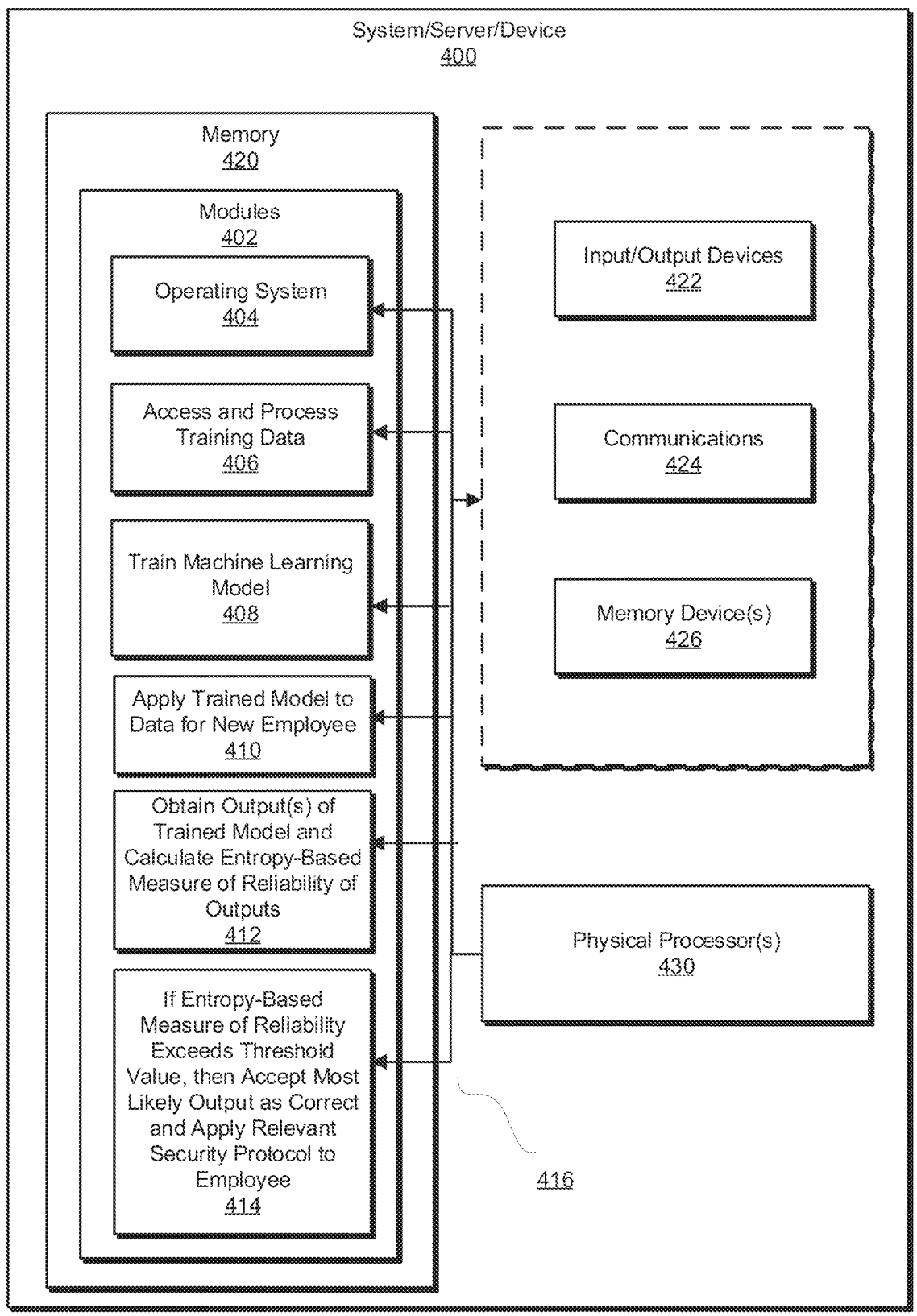
FIG. 4 is a diagram illustrating elements or components that may be present in a computer device, server, or system configured to implement a method, process, function, or operation in accordance with an embodiment of the invention.

FIG. 4 is a diagram illustrating elements or components that may be present in a computer device, server, or system 400 configured to implement a method, process, function, or operation in accordance with an embodiment of the invention. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a specific function, method, process, or operation that is implemented by the module or sub-module. Such function, method, process, or operation may include those used to implement one or more aspects of the disclosed system and methods, such as for:

Accessing and processing training data for a machine learning model—the training data including job characteristic data (e.g., title and department) for each of a set of employees;

Training a machine learning (ML) model using the employee job characteristic data (attributes) and a label regarding each employee's correct seniority level and/or functional role in an organization;

Applying the trained machine learning model to data regarding a new employee (one not used in the training process), the trained model operating on the input data or information to generate an output representing the employee's most likely seniority level(s) and/or functional role(s) and a measure of the confidence (or probability of being correct) in that output or outputs;

Determining an entropy-based measure of the reliability associated with the top-k most likely values for the model output or classification for the new employee, where k is a selected integer (e.g., k=3);

Determining whether to accept the most likely output of the model (the output with the highest probability or confidence level) as being reliable by comparing the entropy-based measure to a threshold value;

If the entropy-based measure exceeds the threshold value, then accepting the most likely output of the model as reliable (i.e., correct for purposes of using the output);

If the entropy-based measure does not exceed the threshold value, then noting the employee's seniority level or role as uncertain, unknown, or undetermined;

If the output of the model with the highest confidence level is accepted as reliable, then applying a specific security protocol or requirement to the employee based on their seniority level and/or functional role (and hence due to likely belonging to the segmented group of privileged people (PP) having access to proprietary data and systems), where such a security protocol or requirement may be one or more of:

Denying access to specific systems, networks, or data from externally controlled networks, such as login from an internet café;

Enforcing stronger identification protocols for the employee, such as multi-factor authentication (MFA);

Setting a stricter security policy for the employee;

Preventing copying of proprietary data to a portable memory device without authorization from another employee;

Configuring or tuning other security systems or products based on the employee's seniority and/or role function to tighten policies or configurations, such as a firewall policy limiting access to a site for employees with certain seniority or functional roles; and Applying extended training courses regarding security and safety for each of the group of privileged people.

In one example, the threshold value for the entropy-based reliability measure may be selected by considering a balance between the sensitivity of the approach to false positives and to false negatives. A higher threshold value will result in a lower false positive rate, while a lower threshold value will result in a lower false negative rate. A grid search algorithm (e.g., brute force) can be used to evaluate threshold options using a validation set (a section of the training data) and thereby enable selection of a threshold value that maximizes results with respect to the balance between false positives and false negatives that is most applicable for a task.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, FIG. 4 is a diagram illustrating elements or components that may be present in a computer device or system 400 containing a set of modules 402, with each module containing executable instructions that when executed by an electronic processor implement a method, process, function, or operation in accordance with an embodiment of the invention.

As shown in the figure, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function or method. Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

As shown in the figure, modules 402 may contain one or more sets of instructions for performing a method or function described with reference to FIG. 3. These modules may include those illustrated but may also include a greater number or fewer number than those illustrated. For example, Access and Process Training Data Module 406 may contain instructions that when executed perform a process to access job characteristic data for each of a set of employees (such as job title and department for each employee) and a corresponding label or classification for the correct seniority and/or function (role) for each employee. Train Machine Learning Model Module 408 may contain instructions that when executed perform a process to train a machine learning model to respond to job characteristic data regarding an employee and in response generate or output a classification or classifications for that employee with regards to the employee's seniority and/or function.

Apply Trained Model to Data for New Employee Module 410 may contain instructions that when executed perform a process to receive as an input job characteristic data regarding a new employee (not one used as part of the training data) and generate one or more likely classifications for that employee, along with an associated probability or confidence level for each classification. Obtain Output(s) of Trained Model and Calculate Entropy-Based Measure of Reliability of Outputs Module 412 may contain instructions that when executed perform a process to calculate or determine an entropy-based measure associated with the top-k outputs of the model. If Entropy-Based Measure of Reliability Exceeds Threshold Value, then Accept Most Likely Output as Correct and Apply Relevant Security Protocol to Employee Module 414 may contain instructions that when executed perform a process to compare the calculated entropy-based measure or metric against a threshold value and depending upon the result, either accept the top ranked model output as correct and implement an appropriate security protocol, or note the model output as unknown, undetermined, or uncertain.

Figure 5:
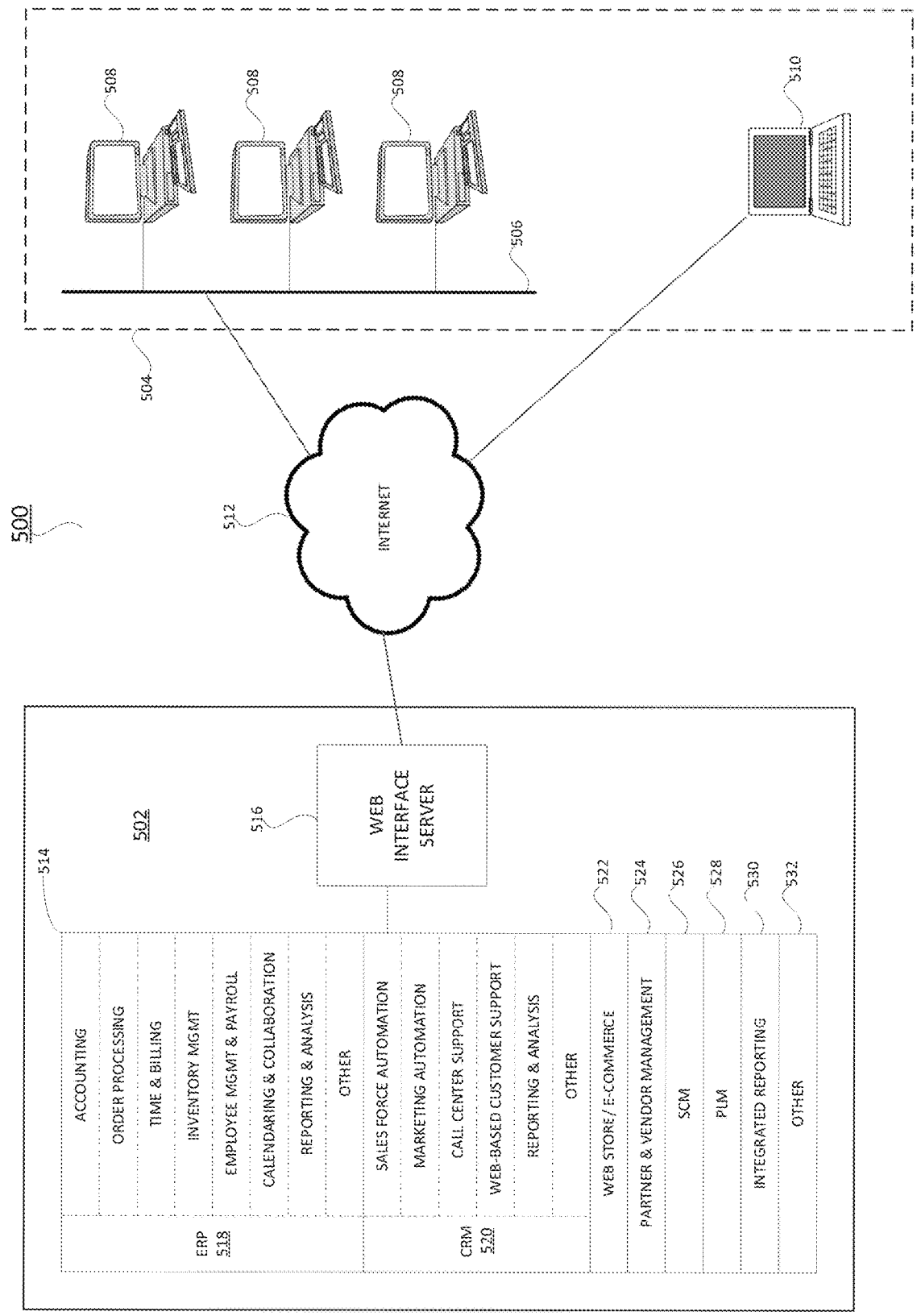
FIGS. 5-7 are diagrams illustrating an architecture for a multi-tenant or SaaS platform that may be used in implementing an embodiment of the systems and methods described herein.
Figure 6:
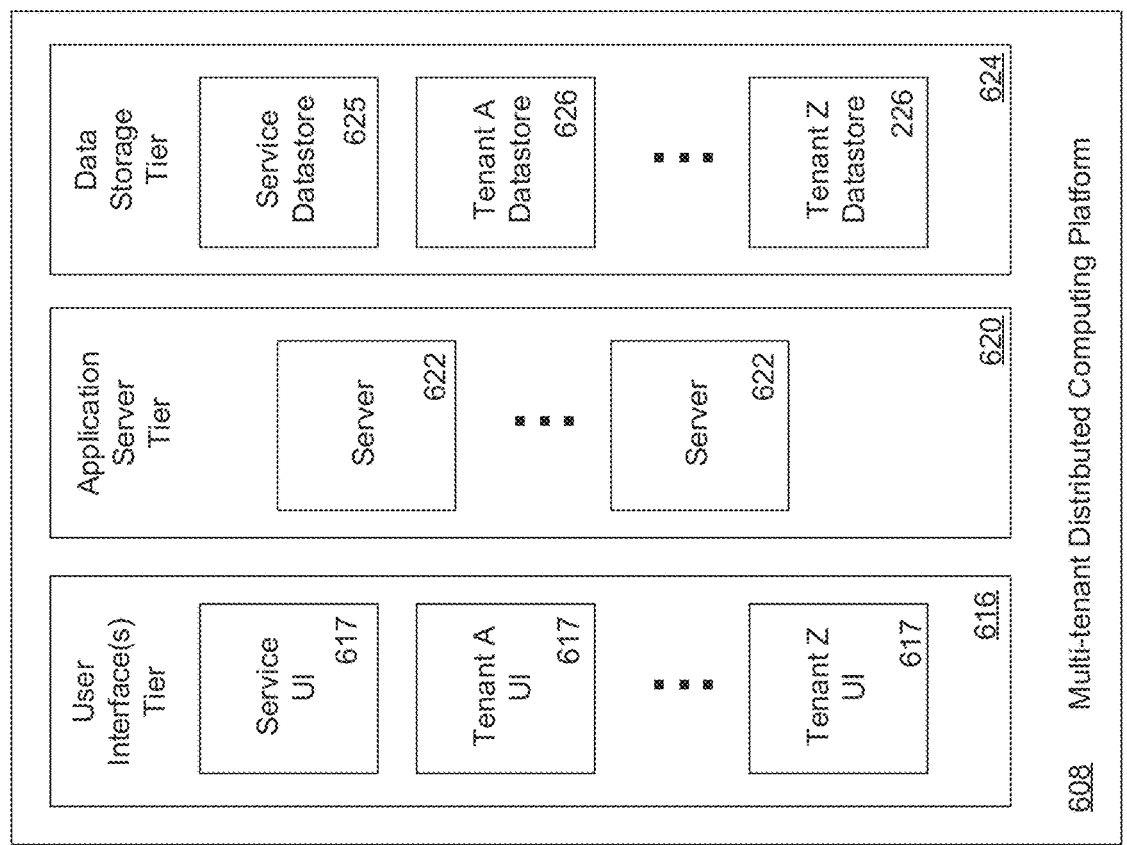
Figure 6:
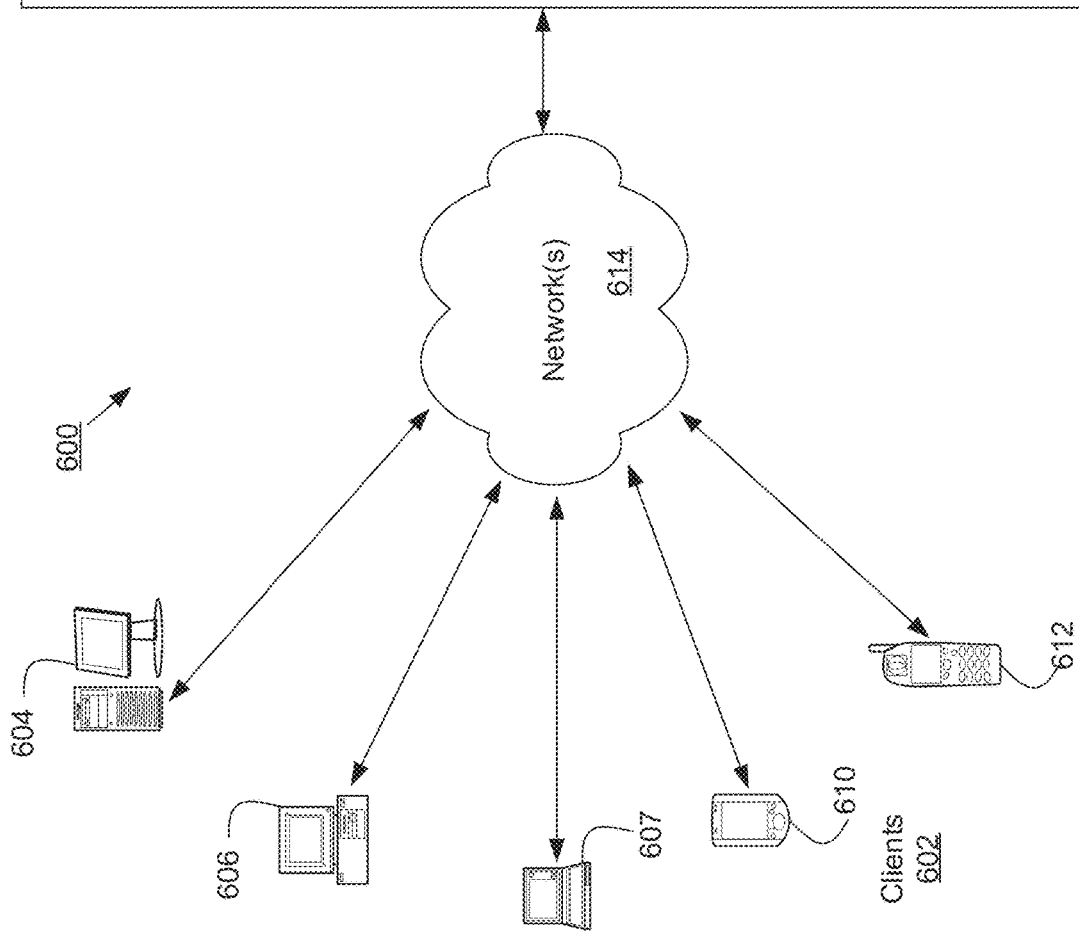
Figure 7:
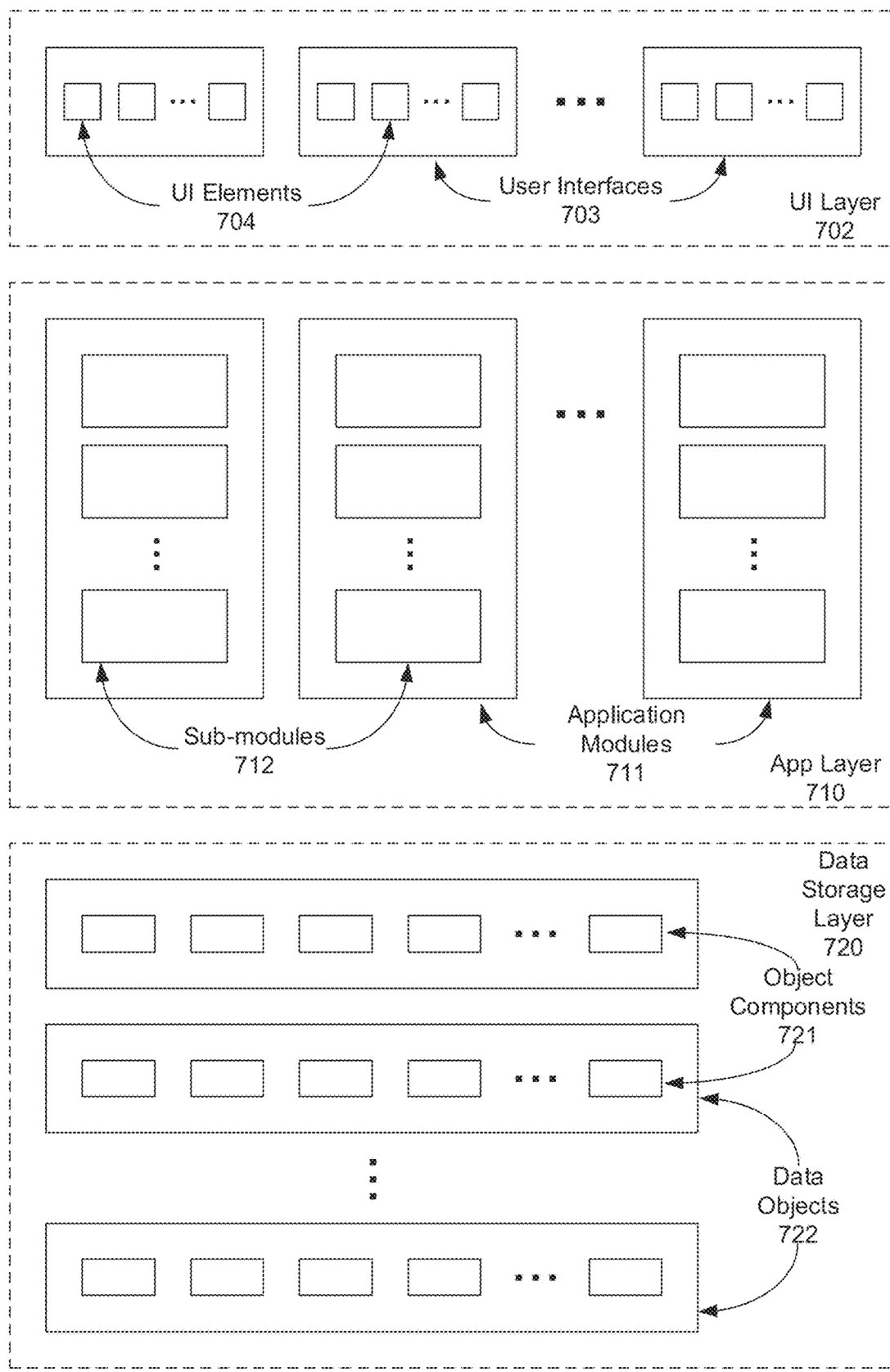

In some embodiments, the functionality and services provided by the system and methods described herein may be made available to multiple users, with each user having an account maintained by a server or server platform. Such a server or server platform may be termed a form of Software-as-a-Service (SaaS). FIG. 5 is a diagram illustrating a SaaS system, including an integrated business system and an enterprise network in which an embodiment of the invention may be implemented. FIG. 6 is a diagram illustrating elements or components of an example operating environment in which an embodiment of the invention may be implemented. FIG. 7 is a diagram illustrating additional details of the elements or components of the multi-tenant distributed computing service platform of FIG. 6, in which an embodiment of the invention may be implemented.

Note that although FIGS. 5-7 illustrate a multi-tenant or SaaS architecture for the delivery of ERP and CRM business-related applications and services to multiple accounts/users, such an architecture may also be used to deliver other types of data processing services and provide access to other business-related applications. For example, in the context of the present application, such an architecture may be used to provide email analysis and filtering services, network cybersecurity services, risk evaluation services, employee segmentation services, risk remediation services, etc. through access to one or more applications, services or models.

Each account may correspond to a separate user, corporation, or organization. In some examples, each account may correspond to a subset of the employees of a corporation or members of an organization.

As noted, in some embodiments, aspects of the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 5-7. Note that embodiments of the invention may also be implemented in the context of other computing or operational environments or systems, such as for an individual business data processing system, a private network used with a plurality of client terminals, a remote or on-site data processing system, another form of client-server architecture, etc.

FIG. 5 is a diagram illustrating a system 500 in which an embodiment of the invention may be implemented. Enterprise network 504 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 504 is represented by an on-site local area network 506 to which a plurality of personal computers 508 are connected, each generally dedicated to a particular end user, such as a service agent or other employee (although such dedication is not required), along with an exemplary remote user computer 510 that can be, for example, a laptop computer, tablet computer, or smartphone of an employee having internet access through a public Wi-Fi access point, or other internet access method. The end users (consumers) associated with computers 508 and 510 may possess an internet-enabled smartphone or other electronic device (such as a PDA, tablet, laptop computer) having wireless internet access or other synchronization capabilities. Users of the enterprise network 504 interface with the integrated business system 502 across the Internet 512 or another suitable communications network or combination of networks.

Integrated business system 502, which may be hosted by a dedicated third party, may include an integrated business server 514 and a web interface server 516, coupled as shown in FIG. 5. It is to be appreciated that either or both of the integrated business server 514 and the web interface server 516 may be implemented on one or more different hardware systems and components, even though represented as singular units in FIG. 5.

In a typical example in which system 502 is operated by a third party for the benefit of multiple account owners/tenants, each of whom is operating a business, integrated business server 514 comprises a set of business-related application. These applications may include an ERP module 518 and further comprises a CRM module 520. In many cases, it will be desirable for the ERP module 518 to share methods, libraries, databases, subroutines, variables, etc., with CRM module 520. In some examples, ERP module 518 may be intertwined with CRM module 520 into an integrated Business Data Processing Platform (which may be single tenant but is typically multi-tenant).

The ERP module 518 may include, but is not limited to or required to include, a finance and accounting module, an order processing module, a time and billing module, an inventory management and distribution module, an employee management and payroll module, a calendaring and collaboration module, a reporting and analysis module, and other ERP-related modules and functionality (eCommerce, point of sales, product information management, demand/material requirements planning (MRP), purchasing, content management systems (CMS), professional services automation (PSA), human resources management, and employee calendaring and collaboration).

The CRM module 520 may include, but is not limited to or required to include, a sales force automation (SFA) module, a marketing automation module, a contact list module (not shown), a call center support module, a web-based customer support module, a reporting and analysis module, a returns management authorization module (RMA), a loyalty program support module, and other CRM-related modules. The integrated business server 514 (or multi-tenant data processing platform) further may provide other business functionalities including a web store/eCommerce module 522, a partner and vendor management module 524, and an integrated reporting module 530. An SCM (supply chain management) module 526 and PLM (product lifecycle management) module 528 may also be provided. Web interface server 516 is configured and adapted to interface with the integrated business server 514 to provide one or more web-based user interfaces to end users of the enterprise network 504.

The integrated business system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment of the invention may be implemented. As shown, a variety of clients 602 incorporating and/or incorporated into a variety of computing devices may communicate with a distributed computing service/platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or computer components including computer servers and processors, and may perform various functions, methods, processes, or operations as determined by the execution of a software application or set of instructions. The data storage tier 624 may include one or more data stores, which may include a Service Data store 625 and one or more Tenant Data stores 626.

Each tenant data store 626 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

Distributed computing service platform 608 may be multi-tenant and service platform 608 may be operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted with reference to FIG. 5, such business information systems may include an Enterprise Resource Planning (ERP) system that integrates the capabilities of several historically separate business computing systems into a common system, with the intention of streamlining business processes and increasing efficiencies on a business-wide level. Such functions or business applications are typically implemented by one or more modules of software code/instructions that are maintained on and executed by one or more servers 622 that are part of the platform's Application Server Tier 620.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. Such functions or business applications are typically implemented by one or more modules of software code/instructions that are maintained on and executed by one or more servers 622 that are part of the platform's Application Server Tier 620.

In addition to ERP and CRM functions, a business information system/platform (such as element 608) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM)

system. Such functions or business applications are typically implemented by one or more modules of software code/ instructions that are maintained on and executed by one or more servers 622 that are part of the platform's Application Server Tier 620.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may be integrated and executed by a single code base accessing one or more integrated databases as necessary, forming an integrated business management system or platform.

As noted with regards to FIG. 5, the integrated business system shown in FIG. 6 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, where individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business-related data that is resident on the platform. The extension may be developed by the tenant or by a 3d party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Tenant customizations to the platform may include custom functionality (such as the capability to perform tenant or user-specific functions, data processing, or operations) built on top of lower level operating system functions. Some multi-tenant service platforms may offer the ability to customize functions or operations at different levels of the service platform, from aesthetic modifications to a graphical user interface to providing integration of components and/or entire applications developed by independent third-party vendors. This can be very beneficial, since by permitting use of components and/or applications developed by third party vendors, a multi-tenant service can significantly enhance the functionality available to tenants and increase tenant satisfaction with the platform.

FIG. 7 is a diagram illustrating additional details of the elements or components of the multi-tenant distributed computing service platform of FIG. 6, in which an embodiment of the invention may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing ERP, CRM, eCommerce or other functionality to a user of the platform). Such function, method, process, or operation may include those used to implement one or more aspects of the inventive system and methods, such as for one or more of the processes or functions described with reference to FIG. 3:

Accessing and processing training data for a machine learning model—the training data including job characteristic data (e.g., title and department) for each of a set of employees;

Training a machine learning (ML) model using the employee job characteristic data (attributes) and a label regarding each employee's correct seniority level and/ or functional role in an organization;

Applying the trained machine learning model to data regarding a new employee (one not used in the training process), the trained model operating on the input data or information to generate an output representing the employee's most likely seniority level(s) and/or functional role(s) and a measure of the confidence (or probability of being correct) in that output or outputs;

Determining an entropy-based measure of the reliability associated with the top-k most likely values for the model output or classification for the new employee, where k is a selected integer (e.g., k=3);

Determining whether to accept the most likely output of the model (the output with the highest probability or confidence level) as being reliable by comparing the entropy-based measure to a threshold value;

If the entropy-based measure exceeds the threshold value, then accepting the most likely output of the model as reliable (i.e., correct for purposes of using the output);

If the entropy-based measure does not exceed the threshold value, then noting the employee's seniority level or role as uncertain, unknown, or undetermined;

If the output of the model with the highest confidence level is accepted as reliable, then applying a specific security protocol or requirement to the employee based on their seniority level and/or functional role (and hence due to likely belonging to the segmented group of privileged people (PP) having access to proprietary data and systems), where such a security protocol or requirement may be one or more of:

Denying access to specific systems, networks, or data from externally controlled networks, such as login from an internet café;

Enforcing stronger identification protocols for the employee, such as multi-factor authentication (MFA);

Setting a stricter security policy for the employee;

Preventing copying of proprietary data to a portable memory device without authorization from another employee;

Configuring or tuning other security systems or products based on the employee's seniority and/or role function to tighten policies or configurations, such as a firewall policy limiting access to a site for employees with certain seniority or functional roles; and Applying extended training courses regarding security and safety for each of the group of privileged people.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further example environments in which an embodiment of the invention may be implemented in whole or in part include devices (including mobile devices), software applications, systems, apparatuses, networks, SaaS platforms, IaaS (infrastructure-as-a-service) platforms, NaaS (network-as-a-service) platforms, or other configurable components that may be used by multiple users for data entry, data processing, application execution, or data review.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

In some embodiments, certain of the methods, models or functions described herein may be embodied in the form of a trained neural network, where the network is implemented by the execution of a set of computer-executable instructions. The instructions may be stored in (or on) a non-transitory computer-readable medium and executed by a programmed processor or processing element. The specific form of the method, model or function may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision, classification, or value as an output.

In general terms, a neural network may be viewed as a system of interconnected artificial "neurons" that exchange messages between each other. The connections have numeric weights that are "tuned" or set during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a dataset of inputs in an assortment of representative input patterns that are associated with their intended output response (e.g., a label). Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and That which is claimed is:

1. A method of reducing the cybersecurity risk of an organization, comprising:
   inputting information about an employee's job characteristics into a trained machine learning model, the trained model operating to respond to the input by producing an output indicating one or more of the employee's seniority level and the employee's role in the organization;
   based on the output of the trained model, determining that the employee belongs to a group of employees having access to data, networks, or systems containing proprietary information;
   identifying one or more cybersecurity procedures or protocols that have been applied to members of the group of employees having access to data, networks, or systems containing proprietary information to reduce the cybersecurity risk to the organization; and
   applying at least one of the one or more identified cybersecurity procedures or protocols to the employee.

2. The method of claim 1, wherein the employee's job characteristics include the employee's title and department.

3. The method of claim 1, further comprising inputting at least a portion of the information about the employee's job characteristics into a first trained machine learning model operating to respond to an input by producing an output indicating an employee's seniority level and inputting at least a portion of the information about the employee's job characteristics into a second trained machine learning model operating to respond to an input by producing an output indicating the employee's role in the organization.

4. The method of claim 3, wherein the first trained machine learning model and the second trained machine learning model are combined into a single model.

5. The method of claim 1, wherein the trained machine learning model outputs a plurality of possible results for the employee's role, along with a confidence level for each result.

6. The method of claim 5, further comprising:
   calculating an entropy-based reliability measure associated with the top-k outputs of the trained model;
   comparing the calculated measure to a predetermined threshold value; and
   based on the comparison, determining whether to accept or reject the top ranked output of the trained model as a valid indication of the employee's role.

7. The method of claim 6, wherein the entropy-based reliability measure is of the form 1−[entropy of top-k values of model output/max entropy value of top-k values].

8. The method of claim 1, wherein determining that the employee belongs to a group of employees having access to data, networks, or systems containing proprietary information further comprises determining that the employee has a senior position in the organization's legal, finance, product, sales, operations, or research and development department.

9. The method of claim 8, wherein determining that the employee has a senior position further comprises determining that the employee is one of a manager, executive or member of a board of directors.

10. The method of claim 1, wherein the one or more cybersecurity procedures or protocols that have been applied to members of the group of employees having access to data or systems containing proprietary information include:
   denying access to the systems, networks, or data from externally controlled networks;
   enforcing stronger identification protocols for the employee;
   preventing copying of proprietary data to a portable memory device without authorization from another employee; and
   implementing a firewall policy limiting access to a specific website.

11. The method of claim 1, further comprising training the machine learning model using job characteristic data for a plurality of people and a label identifying the correct seniority level or role of each person.

12. An apparatus comprising:
   at least one electronic processor;
   an electronic non-transitory data storage element including a set of computer-executable instructions that, when executed by the electronic processor, cause the apparatus to
      input information about an employee's job characteristics into a trained machine learning model, the trained model operating to respond to the input by producing an output indicating one or more of the employee's seniority level and the employee's role in the organization;
      based on the output of the trained model, determining that the employee belongs to a group of employees having access to data, networks, or systems containing proprietary information;
      identify one or more cybersecurity procedures or protocols that have been applied to members of the group of employees having access to data, networks, or systems containing proprietary information to reduce the cybersecurity risk to the organization; and
      apply at least one of the one or more identified cybersecurity procedures or protocols to the employee.

13. The apparatus of claim 12, wherein the employee's job characteristics include the employee's title and department.

14. The apparatus of claim 12, further comprising inputting at least a portion of the information about the employee's job characteristics into a first trained machine learning model operating to respond to an input by producing an output indicating an employee's seniority level and inputting at least a portion of the information about the employee's job characteristics into a second trained machine learning model operating to respond to an input by producing an output indicating the employee's role in the organization.

15. The apparatus of claim 12, wherein the trained machine learning model outputs a plurality of possible results for the employee's role, along with a confidence level for each result.

16. The apparatus of claim 15, wherein the instructions further cause the apparatus to:
   calculate an entropy-based reliability measure associated with the top-k outputs of the trained model;
   compare the calculated measure to a predetermined threshold value; and
   based on the comparison, determine whether to accept or reject the top ranked output of the trained model as a valid indication of the employee's role.

17. The apparatus of claim 12, wherein determining that the employee belongs to a group of employees having access to data, networks, or systems containing proprietary information further comprises determining that the employee has a senior position in the organization's legal, finance, product, sales, operations, or research and development department.

18. A non-transitory computer-readable medium comprising one or more computer-executable instructions that, when executed by at least one processor of a computing device, cause the computing device to:

input information about an employee's job characteristics into a trained machine learning model, the trained model operating to respond to the input by producing an output indicating one or more of the employee's seniority level and the employee's role in the organization;

based on the output of the trained model, determining that the employee belongs to a group of employees having access to data, networks, or systems containing proprietary information;

identify one or more cybersecurity procedures or protocols that have been applied to members of the group of employees having access to data, networks, or systems containing proprietary information to reduce the cybersecurity risk to the organization; and apply at least one of the one or more identified cybersecurity procedures or protocols to the employee.

19. The non-transitory computer-readable medium of claim 18, wherein the employee's job characteristics include the employee's title and department.

20. The non-transitory computer-readable medium of claim 18, wherein the trained machine learning model outputs a plurality of possible results for the employee's role, along with a confidence level for each result, and further, wherein the instructions further cause the computing device to:

calculate an entropy-based reliability measure associated with the top-k outputs of the trained model;

compare the calculated measure to a predetermined threshold value; and based on the comparison, determine whether to accept or reject the top ranked output of the trained model as a valid indication of the employee's role.

* * * * *